(12) United States Patent
Feng

(10) Patent No.: US 11,256,349 B2
(45) Date of Patent: Feb. 22, 2022

(54) FLEXIBLE TOUCH SCREEN STRUCTURE HAVING DEFECT DETECTION LINE AND MANUFACTURING METHOD THEREOF

(71) Applicant: Wuhan China Star Optoelectronics Semiconductor Display Technology Co., Ltd., Wuhan (CN)

(72) Inventor: Xiaoliang Feng, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 230 days.

(21) Appl. No.: 16/620,006

(22) PCT Filed: Jun. 28, 2019

(86) PCT No.: PCT/CN2019/093488
§ 371 (c)(1),
(2) Date: Dec. 6, 2019

(87) PCT Pub. No.: WO2020/211196
PCT Pub. Date: Oct. 22, 2020

(65) Prior Publication Data
US 2021/0333914 A1    Oct. 28, 2021

(30) Foreign Application Priority Data

Apr. 18, 2019 (CN) .......................... 201910312492.0

(51) Int. Cl.
*G06F 3/041* (2006.01)
*G09G 3/00* (2006.01)

(52) U.S. Cl.
CPC .......... *G06F 3/0412* (2013.01); *G09G 3/006* (2013.01); *G09G 3/035* (2020.08);
(Continued)

(58) Field of Classification Search
CPC ......... G06F 3/0412; G06F 2203/04102; G06F 2203/04103; G09G 3/035; G09G 3/006;
(Continued)

(56) References Cited

U.S. PATENT DOCUMENTS

2016/0293884 A1*  10/2016  Zhang .................... H05B 45/60
2016/0307971 A1*  10/2016  Jeon .................... H01L 51/5246
(Continued)

FOREIGN PATENT DOCUMENTS

| CN | 106098724 A | 11/2016 |
| CN | 106206654 A | 12/2016 |
| CN | 106876603 A | 6/2017 |

*Primary Examiner* — Richard J Hong

(57) ABSTRACT

A flexible touch-screen structure and a manufacturing method of the flexible touch-screen structure are provided. The flexible touch-screen structure includes a substrate, a pattern layer, and a driving chip. The pattern layer is arranged on the substrate and has transmitting electrodes and receiving electrodes. The transmitting electrodes and the receiving electrodes are spaced apart from each other and arranged in directions that intersect each other. The driving chip is placed on one end of the substrate. The driving chip includes at least one defect detecting line and multiple conductive lines. The transmitting electrodes and the receiving electrodes are spaced from and surrounded by the at least one defect detecting line which is placed adjacent to a periphery of the substrate. The conductive lines are electrically connected to the transmitting electrodes and the receiving electrodes.

7 Claims, 4 Drawing Sheets

(52) U.S. Cl.
CPC .............. *G06F 2203/04102* (2013.01); *G06F 2203/04103* (2013.01); *G09G 2330/12* (2013.01)

(58) Field of Classification Search
CPC .............. G09G 2330/12; G09G 3/2092; H01L 27/323; H01L 51/5284; H01L 27/3262; H01L 51/5246; H05B 45/60; C08J 7/043
See application file for complete search history.

(56) References Cited

U.S. PATENT DOCUMENTS

| | | | |
|---|---|---|---|
| 2016/0315284 A1 | 10/2016 | Jeon | |
| 2016/0351093 A1* | 12/2016 | Kim | .................... G09G 3/2092 |
| 2018/0095571 A1* | 4/2018 | Park | .................... G06F 3/0412 |
| 2018/0158741 A1* | 6/2018 | Kim | .................... G09G 3/006 |
| 2018/0218658 A1 | 8/2018 | Kim et al. | |
| 2018/0366529 A1* | 12/2018 | Lee | .................... H01L 27/3262 |
| 2019/0006431 A1* | 1/2019 | Won | .................... H01L 27/323 |
| 2019/0077915 A1* | 3/2019 | Yun | .................... C08J 7/043 |
| 2019/0129551 A1* | 5/2019 | Lee | .................... G06F 3/0412 |
| 2019/0131379 A1* | 5/2019 | Won | .................... H01L 51/5284 |

\* cited by examiner

FLEXIBLE TOUCH SCREEN STRUCTURE HAVING DEFECT DETECTION LINE AND MANUFACTURING METHOD THEREOF

1. FIELD OF DISCLOSURE

The present invention relates to a field of display devices and in particular, to a flexible touch screen structure and a manufacturing method thereof.

2. DESCRIPTION OF RELATED ART

To make a flexible screen, design of various film materials is an important key to enable bending of the flexible screen and mass production. Therefore, very high standards are set for characteristics of the film materials, including flexibility and life cycles. In conventional flexible display panels, a flexible screen has a higher risk of having defects like micro-cracks resulting from a process of peeling off a polyimide (PI) layer of a substrate. To be specific, during the process of peeling off the glass plate of the flexible screen from the PI layer of the substrate, the tension of the PI layer of the substrate causes the micro-cracks to enlarge and further extend to the inside of the flexible screen when the flexible screen is cut, thereby causing damage to internal wiring and a thin film encapsulation structure. Therefore, a touch screen is also affected by the defect and then malfunctions.

SUMMARY

In conventional flexible display panels, a flexible screen has a higher risk of having defects like micro-cracks resulting from a process of peeling off a polyimide (PI) layer of a substrate. To be specific, during the process of peeling off the glass plate of the flexible screen from the PI layer of the substrate, the tension of the PI layer of the substrate causes the micro-cracks to enlarge and further extend to the inside of the flexible screen when the flexible screen is cut, thereby causing damage to internal wiring and a thin film encapsulation structure. Therefore, a touch screen is also affected by the defect and then malfunctions.

It is an objective of the present invention to provide a flexible touch-screen structure and a manufacturing method thereof, thereby achieving quickly detecting whether a periphery of the flexible touch-screen structure has a defect.

Accordingly, the present invention provides a flexible touch-screen structure. The flexible touch-screen structure comprises a substrate, a pattern layer, a driving chip, and an inorganic circuit layer. The pattern layer is disposed on the substrate and comprises a plurality of transmitting electrodes and a plurality of receiving electrodes. The transmitting electrodes and the receiving electrodes are spaced apart from each other and arranged in directions that intersect each other. The driving chip is disposed on one end of the substrate and comprises at least one defect detecting line and a plurality of conductive lines. The transmitting electrodes and the receiving electrodes are spaced from and surrounded by the at least one defect detecting line which is disposed adjacent to a periphery of the substrate. The conductive lines are electrically connected to the transmitting electrodes and the receiving electrodes. The driving chip feeds back whether the periphery of the substrate is defective by measuring an electrical signal of the at least one defect detecting line. The inorganic circuit layer is disposed on the substrate. The inorganic circuit layer is formed at one side of the at least one defect detecting line and disposed away from the periphery.

According to one embodiment of the present invention, the flexible touch-screen structure comprises two defect detecting lines, the two defect detecting lines are disposed at two sides of the inorganic circuit layer and electrically connected to the driving chip, and the defect detecting lines and the inorganic circuit layer surround the transmitting electrodes and the receiving electrodes.

According to one embodiment of the present invention, the inorganic circuit layer is a single solid line, a plurality of trapezoidal lines juxtaposed with each other, or a plurality of block-shaped lines that are staggered with respect to each other.

According to one embodiment of the present invention, the flexible touch-screen structure further comprises an insulating layer disposed on the substrate and a protective layer disposed on the insulating layer, the pattern layer comprises a plurality of bridging metal elements disposed on the insulating layer, each of the bridging metal elements spans each of the receiving electrodes to be electrically connected to each adjacent two of the transmitting electrodes, the protective layer is made of glass or a scratch-resistant flexible film, and the transmitting electrodes and the receiving electrodes are disposed in a same layer.

The present invention further provides a flexible touch-screen structure. The flexible touch-screen structure comprises a substrate, a pattern layer, and a driving chip. The pattern layer is disposed on the substrate. The pattern layer comprises a plurality of transmitting electrodes (Tx) and a plurality of receiving electrodes (Rx). The transmitting electrodes and the receiving electrodes are spaced apart from each other and arranged in directions that intersect each other. The driving chip is disposed on one end of the substrate. The driving chip comprises at least one defect detecting line and a plurality of conductive lines. The transmitting electrodes and the receiving electrodes are spaced from and surrounded by the at least one defect detecting line. The at least one defect detecting line is disposed adjacent to a periphery of the substrate. The conductive lines are electrically connected to the transmitting electrodes and the receiving electrodes. The driving chip feeds back whether the periphery of the substrate is defective by measuring an electrical signal of the at least one defect detecting line.

According to one embodiment of the present invention, the flexible touch-screen structure further comprises an inorganic circuit layer disposed on the substrate. The inorganic circuit layer is formed at one side of the at least one defect detecting line and disposed away from the periphery.

According to one embodiment of the present invention, the flexible touch-screen structure comprises two defect detecting lines, the two defect detecting lines are disposed at two sides of the inorganic circuit layer and electrically connected to the driving chip, and the defect detecting lines and the inorganic circuit layer surround the transmitting electrodes and the receiving electrodes.

According to one embodiment of the present invention, the inorganic circuit layer is a single solid line, a plurality of trapezoidal lines juxtaposed with each other, or a plurality of block-shaped lines that are staggered with respect to each other.

According to one embodiment of the present invention, the flexible touch-screen structure further comprises an insulating layer disposed on the substrate and a protective layer disposed on the insulating layer, the pattern layer comprises a plurality of bridging metal elements disposed on the insulating layer, each of the bridging metal elements spans each of the receiving electrodes to be electrically connected to each adjacent two of the transmitting electrodes, the protective layer is made of glass or a scratch-resistant flexible film, and the transmitting electrodes and the receiving electrodes are disposed in a same layer.

The present invention further provides a manufacturing method of a flexible touch-screen structure, comprising steps as follows:

providing a substrate;

forming a pattern layer on the substrate, wherein the pattern layer comprises a plurality of transmitting electrodes (Tx), a plurality of receiving electrodes (Rx), at least one defect detecting line, and a plurality of conductive lines; the transmitting electrodes and the receiving electrodes are spaced apart from each other and arranged in directions that intersect each other; the transmitting electrodes and the receiving electrodes are surrounded by the at least one defect detecting line, the at least one defect detecting line is disposed adjacent to a periphery of the substrate, and the conductive lines are electrically connected to the transmitting electrodes and the receiving electrodes; and making a driving chip on one end of the substrate, wherein the driving chip is electrically connected to the transmitting electrodes, the receiving electrodes, the at least one defect detecting line, and the conductive lines; and the driving chip feeds back whether the periphery of the substrate is defective by measuring an electrical signal of the at least one defect detecting line.

According to one embodiment of the present invention, the manufacturing method of the flexible touch-screen structure further comprises forming an inorganic circuit layer on the substrate, wherein the inorganic circuit layer is formed at one side of the at least one defect detecting line and disposed away from the periphery, and the at least one defect detecting line, the conductive lines, and the driving chip are manufactured in the same step and disposed in a same layer.

According to one embodiment of the present invention, forming the pattern layer on the substrate comprises forming a first defect detecting line and a second defect detecting line, and the first defect detecting line and the second defect detecting line are formed at two sides of the inorganic circuit layer respectively and connected to the driving chip electrically.

According to one embodiment of the present invention, before the pattern layer is formed, the manufacturing method of the flexible touch-screen structure further comprises forming an insulating layer on the substrate and a protective layer on the insulating layer, wherein the pattern layer comprises forming a plurality of bridging metal elements on the insulating layer, and each of the bridging metal elements spans each of the receiving electrodes and is electrically connected to each adjacent two of the transmitting electrodes.

According to one embodiment of the present invention, the inorganic circuit layer is a single solid line, a plurality of trapezoidal lines juxtaposed with each other, or a plurality of block-shaped lines that are staggered with respect to each other; and the substrate is made of glass, polyethylene, polymethyl methacrylate, cyclo-olefin polymer, or polyimide, or the substrate is a thin-film-transistor liquid crystal display or a low temperature poly-silicon organic-light-emitting-diode display screen.

Advantages of the Present Invention

The inorganic circuit layer disposed at one side of the at least one defect detecting line can reinforce the substrate. In other words, the inorganic circuit layer can prevent defects (e.g. micro-cracks) from further extending inwards of the flexible touch-screen structure. By using the defect detecting line of the present invention, the flexible touch screen of the present invention has efficient quality control and improved quality at reduced costs, and also prevents unstable product quality to cause customer complaints.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work or paying the premise.

DETAILED DESCRIPTION OF EMBODIMENTS

References to "embodiments" in the following detailed description mean that the specific features, structures or characteristics described in connection with the embodiments may be included in at least one embodiment of the present invention. The same terms appearing in different places in the specification are not necessarily limited to the same embodiment, but should be understood as independent or alternative embodiments to other embodiments. In view of the technical solutions disclosed in the embodiments of the present invention, those skilled in the art should understand that the embodiments described herein may have other changes or modifications in accordance with the embodiments of the present invention.

Figure 1:
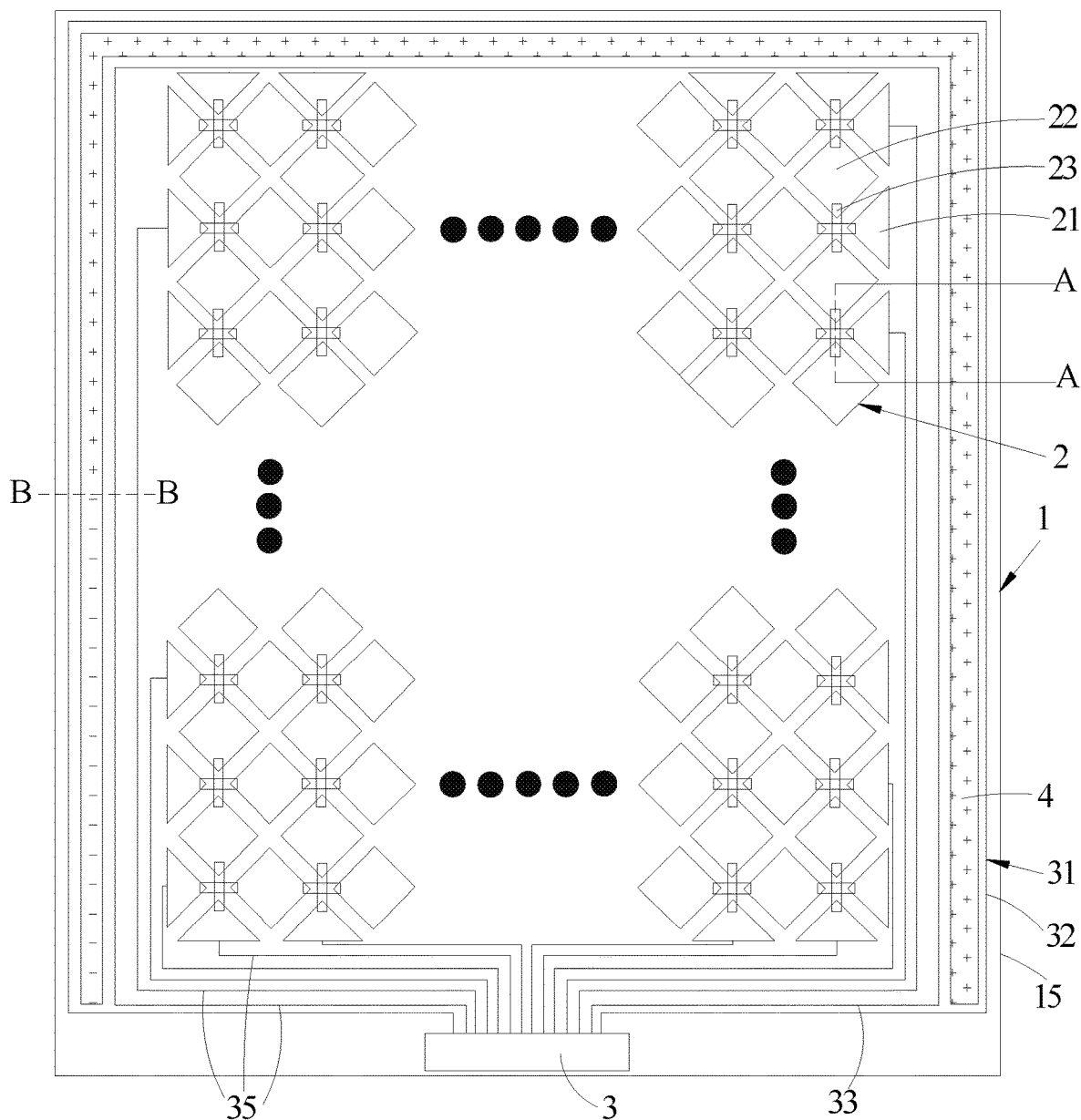
FIG. 1 is a schematic planar view illustrating a flexible touch screen structure of the present invention.

Please refer to FIG. 1 which is a schematic planar view illustrating a flexible touch screen structure of the present invention. As shown in FIG. 1, the present invention provides a flexible touch screen structure 1. The flexible touch screen structure 1 comprises a substrate 11, a pattern layer 2, and a driving chip 3. The substrate 11 is made of glass, polyethylene (PE), polymethyl methacrylate (PMMA), cyclo-olefin polymer (COP), or polyimide (PI). When the substrate 11 is made of hard glass, the touch screen structure of the present invention can also be used in a hard touch screen. However, in alternative embodiments, the substrate 11 may also be a thin-film-transistor liquid crystal display (TFT-LCD), a low temperature poly-silicon organic-light-emitting-diode (LTPS-OLED) display screen, a plasma display screen, or a laser display technology (LDT) display screen.

Figure 2:
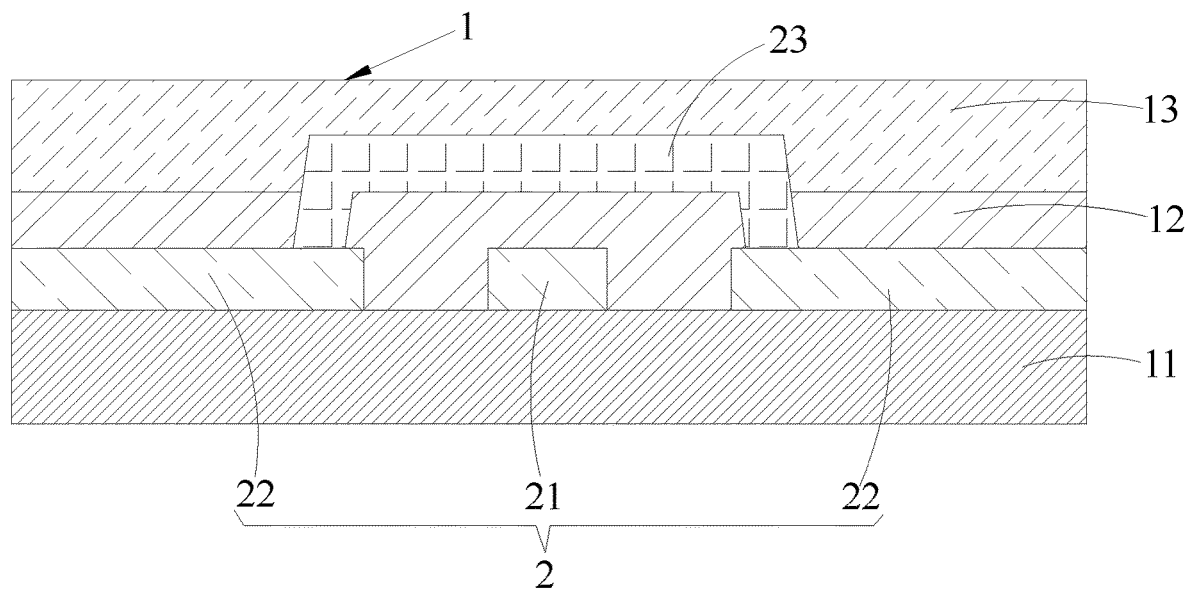
FIG. 2 is a cross-sectional view taken along line A-A of FIG. 1.

Referring to FIG. 2, the pattern layer 2 is disposed on the substrate 11. The pattern layer 2 comprises a plurality of transmitting electrodes (Tx) 22 and a plurality of receiving electrodes (Rx) 21. The transmitting electrodes 22 and the receiving electrodes 21 are spaced apart from each other and arranged in directions that intersect each other. The driving chip 3 is disposed on one end of the substrate 11, i.e., on the bottom of the substrate 11.

The driving chip 3 comprises at least one defect detecting line 31 and a plurality of conductive lines 35. The transmitting electrodes 22 and the receiving electrodes 21 are spaced from and surrounded by the at least one defect detecting line 31, and the at least one defect detecting line 31 is disposed adjacent to a periphery 15 of the substrate 11. The conductive lines 35 are electrically connected to the transmitting electrodes 22 and the receiving electrodes 21. The driving chip 3 feeds back whether the periphery 15 of the substrate 11 is defective (e.g., cracks or breakage) by measuring an electrical signal (not illustrated) of the at least one defect detecting line 3, thereby quickly detecting whether the periphery 15 of the flexible touch screen structure 1 has a defect.

Specifically, when the periphery 15 of the substrate 11 has a defect that extends to the defect detecting line 31, it can be known whether the periphery 15 of the flexible touch screen 1 has a defect in need of maintenance by measuring the electrical signal of the defect detecting line 31 to determine if there is a current change, a resistance change, or the like.

Figure 3:
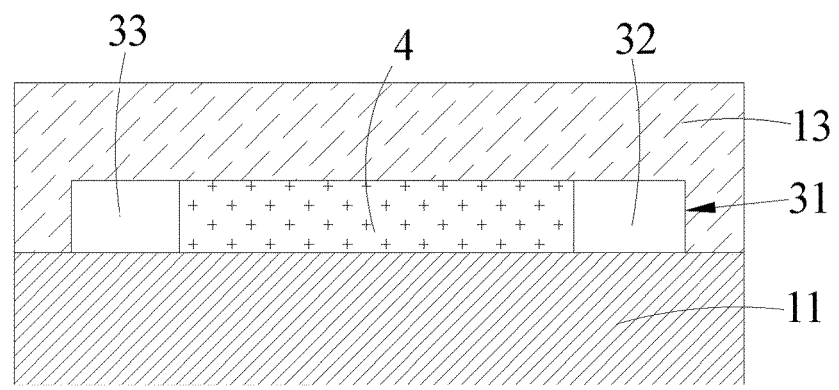
FIG. 3 is a cross-sectional view taken along line B-B of FIG. 1.

Referring to FIG. 3, the flexible touch screen structure 1 further comprises an inorganic circuit layer 4 disposed on the substrate 11. The inorganic circuit layer 4 is formed at one side of the at least one defect detecting line 31 and disposed away from the periphery 15. It is preferable that the flexible touch-screen structure 1 comprises two defect detecting lines 31 including, for example, a first defect detecting line 32 and a second defect detecting line 33. The first defect detecting line 32 and the second detect detecting line 33 are disposed at two sides of the inorganic circuit layer 4 and electrically connected to the driving chip 3. The first defect detecting line 32, the second defect detecting line 33, and the inorganic circuit layer 4 surround the transmitting electrodes 22 and the receiving electrodes 21.

The first defect detecting line 32 and the second defect detecting line 33 are not connected to any of transmitting electrodes 22 and any of the receiving electrodes 21. The first defect detecting line 32 and the second defect detecting line 33 are made of a material the same as a material of the conductive lines 35; the material is, for example, gold, copper, iron, or an alloy thereof.

Figure 4A:
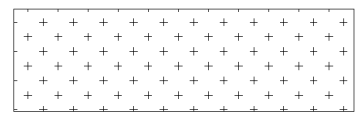
FIGS. 4A to 4C are schematic views illustrating various cross-sections of an inorganic circuit layer of the present invention.
Figure 4B:
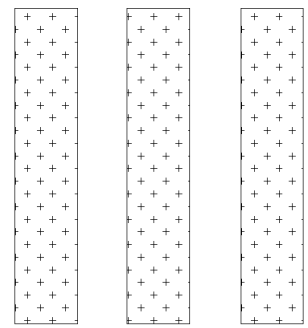
Figure 4B:
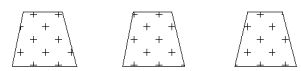
Figure 4C:
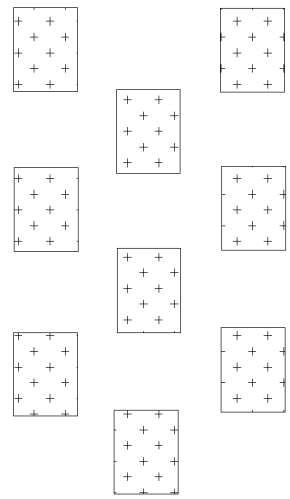

Please also refer to FIGS. 4A to 4C. In FIG. 4A, the inorganic circuit layer 4 is a single solid line. In FIG. 4B, the inorganic circuit layer 4 consists of a plurality of trapezoidal lines juxtaposed with each other. A cross-section of each trapezoidal line is shown in the bottom of FIG. 4B. In FIG. 4C, the inorganic circuit layer 4 consists of a plurality of block-shaped lines that are staggered with respect to each other. In the foregoing various configurations of the inorganic circuit layer 4, the inorganic circuit layer 4 is better segmented or divided into blocks to have improved performance. However, it is easier and simpler to manufacture the inorganic circuit layer 4 as a single solid line; manufacture may vary according to actual needs. The inorganic circuit layer 4 disposed between the first defect detecting line 32 and the second defect detecting line 33 is configured to reinforce the substrate 11. In other words, the inorganic circuit layer 4 can prevent defects (e.g. micro-cracks) from further extending inwards of the flexible touch-screen structure 1.

In the embodiment shown in FIGS. 1 to 3, the flexible touch-screen structure 1 further comprises an insulating layer 12 disposed on the substrate 11 and a protective layer 13 disposed on the insulating layer 12. The pattern layer 2 comprises a plurality of bridging metal elements 23 disposed on the insulating layer 12. Each of the bridging metal elements 23 spans each of the receiving electrodes 21 to be electrically connected to each adjacent two of the transmitting electrodes 22. The protective layer 13 is made of glass, a scratch-resistant flexible film, or other suitable cover plate. As shown in FIG. 2, the transmitting electrodes 22 and the receiving electrodes 21 are disposed in a same layer. The pattern layer 2 of the present embodiment is illustrated in FIG. 2 as an example; however, the pattern layer 2 is not limited to this example.

Figure 5:
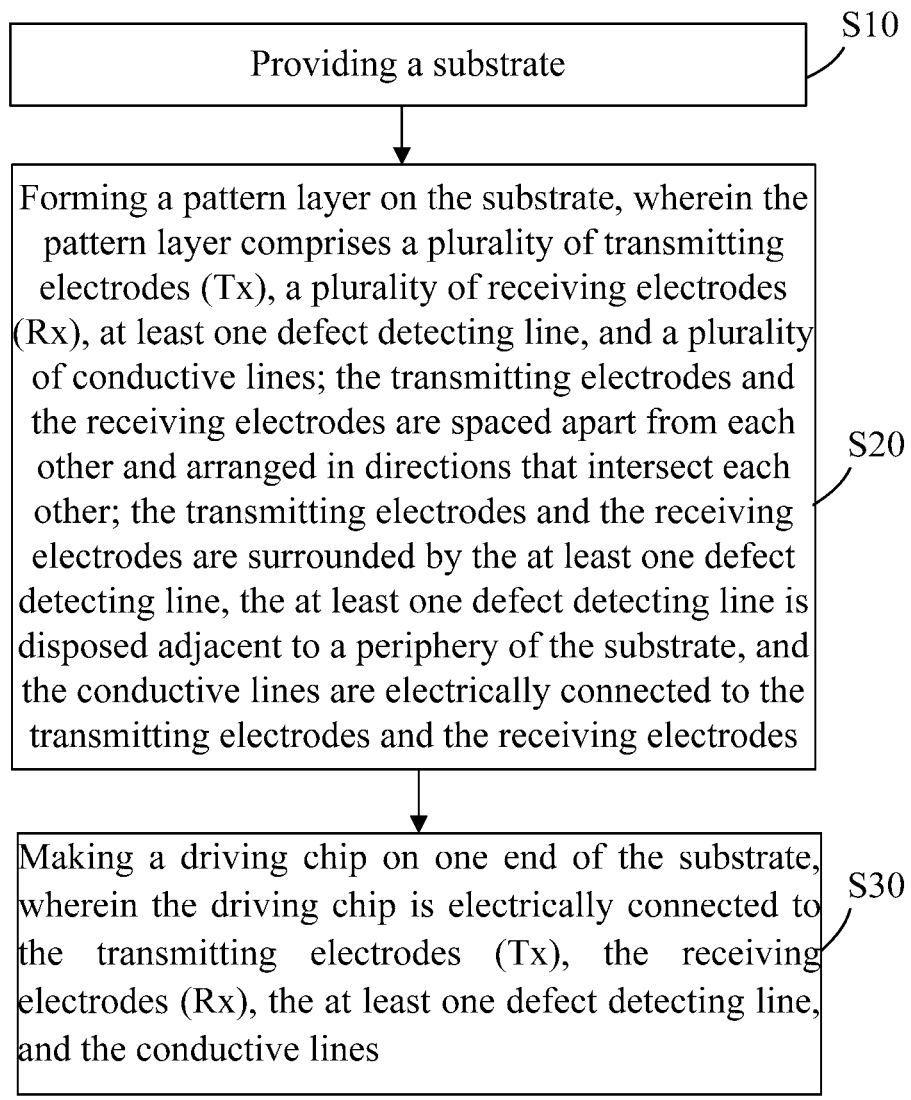
FIG. 5 is a process flow diagram illustrating a manufacturing method of the flexible touch screen structure.

Referring to FIG. 5, the present invention further provides a manufacturing method of a flexible touch-screen structure 1, comprising steps as follows.

S10: providing a substrate 11;

S20: forming a pattern layer 2 on the substrate 11, wherein the pattern layer 2 comprises a plurality of transmitting electrodes (Tx) 22, a plurality of receiving electrodes (Rx) 21, at least one defect detecting line 31, and a plurality of conductive lines 35; the transmitting electrodes 22 and the receiving electrodes 21 are spaced apart from each other and arranged in directions that intersect each other; the transmitting electrodes 22 and the receiving electrodes 21 are surrounded by the at least one defect detecting line 31, the at least one defect detecting line 31 is disposed adjacent to a periphery 15 of the substrate 11, and the conductive lines 35 are electrically connected to the transmitting electrodes 22 and the receiving electrodes 21; and S30: making a driving chip 3 on one end of the substrate 11, wherein the driving chip 3 is electrically connected to the transmitting electrodes (Tx) 22, the receiving electrodes (Rx) 21, the at least one defect detecting line 31, and the conductive lines 35; and the driving chip 3 feeds back whether the periphery 15 of the substrate 11 is defective by measuring an electrical signal of the at least one defect detecting line 31.

Step S20 further comprises forming an inorganic circuit layer 4 on the substrate 11, wherein the inorganic circuit layer 4 is formed at one side of the at least one defect detecting line 31 and disposed away from the periphery 15. The flexible touch-screen structure 1 has two defect detecting lines 31 in total, which are, for example, a first defect detecting line 32 and a second defect detecting line 33. The two defect detecting lines 31 are disposed at two sides of the inorganic circuit layer 4 and electrically connected to the driving chip 3. The two defect detecting lines 31 and the inorganic circuit layer 4 surround the transmitting electrodes 22 and the receiving electrodes 21.

Specifically, when the periphery 15 of the substrate 11 has a defect that extends to the defect detecting line 31, it can be known whether the periphery 15 of the flexible touch screen 1 has a defect in need of maintenance by measuring an electrical signal of the defect detecting line 31 to determine if there is a current change, a resistance change, or the like. The inorganic circuit layer 4 disposed between the first defect detecting line 32 and the second defect detecting line 33 is configured to reinforce the substrate 11. In other words, the inorganic circuit layer 4 can prevent defects (e.g. micro-cracks) from further extending inwards of the flexible touch-screen structure 1. When a voltage measurement is taken on the second defect detecting line 33, if the electrical signal is normal, it can be immediately determined that the defect is not extended to the inside of the substrate 11. On the contrary, if the electrical signal is abnormal, it can be known that the flexible touch screen 1 has an increased damage ratio. Therefore, by using the defect detecting line 31 of the present invention, the flexible touch screen 1 of the present invention has effective quality control and improved quality at reduced costs, and also prevents unstable product quality to cause customer complaints.

Before the pattern layer 2 is formed, the manufacturing method of the flexible touch-screen structure 1 further comprises forming an insulating layer 12 on the substrate 11 and a protective layer 13 on the insulating layer 12. The pattern layer comprises forming a plurality of bridging metal elements 23 on the insulating layer 12, and each of the bridging metal elements 23 spans each of the receiving electrodes 21 and is electrically connected to each adjacent two of the transmitting electrodes 22. In step S30, the at least one defect detecting line 31, the conductive lines 35, and the driving chip 3 are manufactured in the same step and disposed in a same layer.

The inorganic circuit layer 4 is, for example, a single solid line, a plurality of trapezoidal lines juxtaposed with each other, or a plurality of block-shaped lines that are staggered with respect to each other; configuration may vary as required. The substrate 11 is made of glass, polyethylene (PE), polymethyl methacrylate (PMMA), cyclo-olefin polymer (COP), or polyimide (PI), or the substrate is a thin-film-transistor liquid crystal display (TFT-LCD) or a low temperature poly-silicon organic-light-emitting-diode (LTPS-OLED) display screen. The protective layer 13 is made of glass, a scratch-resistant flexible film, or other suitable cover plate.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A flexible touch-screen structure, comprising:
    a substrate;
    a pattern layer disposed on the substrate, the pattern layer comprising a plurality of transmitting electrodes and a plurality of receiving electrodes, the transmitting electrodes and the receiving electrodes spaced apart from each other and arranged in directions that intersect each other;
    a driving chip disposed on one end of the substrate, the driving chip comprising two defect detecting lines and a plurality of conductive lines, wherein the transmitting electrodes and the receiving electrodes are spaced from and surrounded by the defect detecting lines, and the defect detecting lines are disposed adjacent to a periphery of the substrate, the conductive lines are electrically connected to the transmitting electrodes and the receiving electrodes, and the driving chip feeds back whether the periphery of the substrate is defective by measuring electrical signals of the defect detecting lines; and
    an inorganic circuit layer disposed on the substrate and disposed away from the periphery, wherein the two defect detecting lines are disposed at two sides of the inorganic circuit layer and electrically connected to the driving chip, and the defect detecting lines and the inorganic circuit layer surround the transmitting electrodes and the receiving electrodes.

2. The flexible touch-screen structure according to claim 1, wherein the inorganic circuit layer is a single solid line, a plurality of trapezoidal lines juxtaposed with each other, or a plurality of block-shaped lines that are staggered with respect to each other.

3. The flexible touch-screen structure according to claim 1, further comprising an insulating layer disposed on the substrate and a protective layer disposed on the insulating layer, wherein the pattern layer comprises a plurality of bridging metal elements disposed on the insulating layer, each of the bridging metal elements spans each of the receiving electrodes to be electrically connected to each adjacent two of the transmitting electrodes, the protective layer is made of glass or a scratch-resistant flexible film, and the transmitting electrodes and the receiving electrodes are disposed in a same layer.

4. A manufacturing method of a flexible touch-screen structure, comprising steps as follows:
    providing a substrate;
    forming a pattern layer on the substrate, wherein the pattern layer comprises a plurality of transmitting electrodes (Tx), a plurality of receiving electrodes (Rx), a first defect detecting line, a second defect detecting line, and a plurality of conductive lines; the transmitting electrodes and the receiving electrodes are spaced apart from each other and arranged in directions that intersect each other; the transmitting electrodes and the receiving electrodes are surrounded by the first defect detecting line and the second defect detecting line, the first defect detecting line is disposed adjacent to a periphery of the substrate, and the conductive lines are electrically connected to the transmitting electrodes and the receiving electrodes;
    making a driving chip on one end of the substrate, wherein the driving chip is electrically connected to the transmitting electrodes (Tx), the receiving electrodes (Rx), the first defect detecting line, the second defect detecting line, and the conductive lines; and the driving chip feeds back whether the periphery of the substrate is defective by measuring electrical signals of the first defect detecting line and the second defect detecting line; and
    forming an inorganic circuit layer on the substrate, wherein the inorganic circuit layer is formed away from the periphery, the first defect detecting line and the second defect detecting line are formed at two sides of the inorganic circuit layer respectively and electrically connected to the driving chip, and the first defect detecting line, the second defect detecting line, and the inorganic circuit layer surround the transmitting electrodes and the receiving electrodes.

5. The manufacturing method of the flexible touch-screen structure according to claim 4, wherein the at least one defect detecting line, the conductive lines, and the driving chip are manufactured in the same step and disposed in a same layer.

6. The manufacturing method of the flexible touch-screen structure according to claim 4, wherein before the pattern layer is formed, the manufacturing method of the flexible touch-screen structure further comprises forming an insulating layer on the substrate and a protective layer on the insulating layer, wherein the pattern layer comprises forming a plurality of bridging metal elements on the insulating layer, and each of the bridging metal elements spans each of the receiving electrodes and is electrically connected to each adjacent two of the transmitting electrodes.

7. The manufacturing method of the flexible touch-screen structure according to claim 4, wherein the inorganic circuit layer is a single solid line, a plurality of trapezoidal lines juxtaposed with each other, or a plurality of block-shaped lines that are staggered with respect to each other; and the substrate is made of glass, polyethylene, polymethyl methacrylate, cyclo-olefin polymer, or polyimide, or the substrate is a thin-film-transistor liquid crystal display or a low temperature poly-silicon organic-light-emitting-diode display screen.

\* \* \* \* \*